United States Patent
Nakashima et al.

(10) Patent No.: US 12,480,014 B2
(45) Date of Patent: Nov. 25, 2025

(54) ACTIVE ENERGY RAY-CURABLE INKJET INK COMPOSITION

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 230 days.

(21) Appl. No.: 18/567,559

(22) PCT Filed: Mar. 9, 2022

(86) PCT No.: PCT/JP2022/010165
§ 371 (c)(1),
(2) Date: Dec. 6, 2023

(87) PCT Pub. No.: WO2023/276290
PCT Pub. Date: Jan. 5, 2023

(65) Prior Publication Data
US 2024/0270994 A1   Aug. 15, 2024

(30) Foreign Application Priority Data
Jun. 29, 2021   (JP) ................. 2021-107985

(51) Int. Cl.
*C09D 11/38* (2014.01)
*B41M 5/00* (2006.01)
*C09D 11/101* (2014.01)

(52) U.S. Cl.
CPC ........... *C09D 11/38* (2013.01); *B41M 5/0023* (2013.01); *C09D 11/101* (2013.01)

(58) Field of Classification Search
CPC ....... C09D 11/101; C09D 11/38; C09D 11/30; B41M 5/0023; C07D 335/16; C08F 2/50; B41J 11/00214; B41J 2/01; B41J 2/2107
See application file for complete search history.

(56) References Cited

U.S. PATENT DOCUMENTS

| | | | |
|---|---|---|---|
| 2010/0081758 A1 | 4/2010 | Yasuda | |
| 2013/0010039 A1* | 1/2013 | Kida | C09D 11/38 522/167 |
| 2015/0344711 A1 | 12/2015 | Shimono et al. | |
| 2019/0085190 A1 | 3/2019 | De Meutter | |
| 2019/0185689 A1* | 6/2019 | Dermaut | B41M 5/0023 |
| 2019/0389236 A1 | 12/2019 | Tiessen et al. | |
| 2020/0102468 A1 | 4/2020 | Chopra et al. | |
| 2021/0371685 A1* | 12/2021 | Sato | C09D 11/107 |
| 2022/0025199 A1* | 1/2022 | Loccufier | B41M 5/0023 |
| 2022/0119656 A1 | 4/2022 | Loccufier et al. | |
| 2022/0119662 A1 | 4/2022 | Retailleau et al. | |

FOREIGN PATENT DOCUMENTS

| | | |
|---|---|---|
| CN | 108884342 A | 11/2018 |
| CN | 110709172 A | 1/2020 |
| CN | 112457715 A | 3/2021 |
| EP | 3686251 A1 | 7/2020 |
| JP | 2009215469 A | 9/2009 |
| JP | 2009233486 A | 10/2009 |
| JP | 2010077308 A | 4/2010 |
| JP | 2014185319 A | 10/2014 |
| JP | 2018188581 A | 11/2018 |
| JP | 2020512182 A | 4/2020 |
| WO | 2020152037 A1 | 7/2020 |

OTHER PUBLICATIONS

A First Office Action with Search Report issued by the Patent Office of the People's Republic of China on Jul. 30, 2025, for Chinese counterpart application No. 202280041687.6 (7 pages).
International Preliminary Report on Patentability, dated Dec. 14, 2023, for corresponding international application PCT/JP2022/010165 (1 page).
Notification Concerning Transmittal of International Preliminary Report on Patentability, mailed Jan. 11, 2024, for corresponding international application PCT/JP2022/010165 (1 page).
Notification of Transmittal of Translation of the International Preliminary Report on Patentability, mailed Jan. 11, 2024, for corresponding international application PCT/JP2022/010165 (1 page).
Written Opinion of the International Searching Authority, mailed May 24, 2022, for corresponding international application PCT/JP2022/010165 (3 pages).
International Search Report (ISR) mailed May 24, 2022, issued for International application No. PCT/JP2022/010165. (2 pages).
Extended European Search Report (EESR) dated Jun. 18, 2025, issued for European counterpart patent application No. EP22832455.4 (6 pages).

* cited by examiner

*Primary Examiner* — John P Zimmermann
(74) *Attorney, Agent, or Firm* — Law Office of Katsuhiro Arai

(57) ABSTRACT

An active energy ray-curable inkjet ink composition contains: (A) hydroxy group-containing monofunctional (meth)acrylates by 20.0 to 60.0% by mass in the total amount of all polymerizable components; (B) polyfunctional monomers having ether bonds; (C) amine-modified oligomers by 10.0 to 50.0% by mass in the total amount of all polymerizable components; (D) ethyl phenyl(2,4,6-trimethylbenzoyl)phosphinate as a polymerization initiator; and (E) polymeric sensitizers. The active energy ray-curable inkjet ink composition allows for printing on films used for food packaging that are subject to more stringent property requirements.

7 Claims, No Drawings

ACTIVE ENERGY RAY-CURABLE INKJET INK COMPOSITION

CROSS-REFERENCE TO RELATED APPLICATIONS

This application is the U.S. National Phase under 35 U.S.C. § 371 of International Application PCT/JP2022/010165, filed Mar. 9, 2022, which claims priority to Japanese Patent Application No. JP2021-107985, filed Jun. 29, 2021. The International Application was published under PCT Article 21(2) in a language other than English.

TECHNICAL FIELD

The present invention relates to an active energy ray-curable inkjet ink composition and a method for printing.

BACKGROUND ART

As described in Patent Literature 1, low-migration inkjet ink compositions containing polymeric initiators having acyl phosphine structure, polymerizable compounds, and colorants, are known.

It is also known that OMNIPOL TX can be contained as a sensitizer and that tripropylene glycol diacrylate and EO-modified trimethylolpropane triacrylate can be used as polymerizable compounds.

BACKGROUND ART LITERATURE

Patent Literature

Patent Literature 1: Japanese Patent Laid-open No. 2014-185319

SUMMARY OF THE INVENTION

Problems to be Solved by the Invention

As described in the aforementioned patent literature, inkjet ink compositions designed to reduce migration are known; however, they fall short of further providing sufficient adhesion to resin films as well as excellent LED curability, while allowing for printing on films used for food packaging that are subject to stricter property requirements. Using ink compositions, not just inkjet ink compositions, on food packaging materials presents concerns that the ink compositions could migrate into the food. Also, in the case of printed matters constituted by ink compositions that are curable by ultraviolet rays or the like, unreacted monomers and photopolymerization initiators may migrate.

Materials that do not migrate easily include polymeric initiators as well as certain monomers and oligomers, but adjusting their viscosity to a range that permits discharge from inkjet heads is difficult.

Means for Solving the Problems

As a result of studying in earnest to solve the aforementioned problems, the inventors of the present invention found that the aforementioned problems could be solved by an active energy ray-curable inkjet ink composition having a specific compositional makeup, and eventually completed the present invention.

To be specific, the present invention is as follows.

1. An active energy ray-curable inkjet ink composition satisfying all of the requirements of (A) to (E) below.
    (A) it contains hydroxy group-containing monofunctional (meth)acrylates by 20.0 to 60.0% by mass in the total amount of all polymerizable components
    (B) it contains polyfunctional monomers having ether bonds
    (C) it contains amine-modified oligomers by 10.0 to 50.0% by mass in the total amount of all polymerizable components
    (D) it contains ethyl phenyl(2,4,6-trimethylbenzoyl)phosphinate as a polymerization initiator
    (E) it contains polymeric sensitizers
2. The active energy ray-curable inkjet ink composition according to 1, wherein a polymeric sensitizer in (E) is a thioxanthone-based compound.
3. The active energy ray-curable inkjet ink composition according to 1 or 2, further containing bis(2,4,6-trimethylbenzoyl)phenylphosphine oxide by 1.0 to 10.0 parts by mass relative to 100 parts by mass representing the total amount of all polymerizable components in the active energy ray-curable inkjet ink composition.
4. The active energy ray-curable inkjet ink composition according to any one of 1 to 3, containing the ethyl phenyl (2,4,6-trimethylbenzoyl)phosphinate by 1.0 to 10.0 parts by mass relative to 100 parts by mass representing the total amount of all polymerizable components in the active energy ray-curable inkjet ink composition.
5. The active energy ray-curable inkjet ink composition according to any one of 1 to 4, wherein a polymeric sensitizer in (E) is (2-carboxymethoxythioxanthone)-(polytetramethylene glycol 250) diester.
6. The active energy ray-curable inkjet ink composition according to any one of 1 to 5, which has (F) a viscosity at 45° C. of 38.0 cps or higher and a viscosity at 80° C. of 15 cps or lower.
7. The active energy ray-curable inkjet ink composition according to any one of 1 to 6, containing polyfunctional monomers having no ether bonds and/or monofunctional alkyl (meth)acrylates.

Effects of the Invention

The active energy ray-curable inkjet ink composition proposed by the present invention has an excellent anti-migration property that makes the ink composition sufficiently usable in food packaging applications, while also proving excellent in adhesion to resin films and in LED curability. In particular, it can be inkjet-printed in a heated state, is adjustable to an appropriate viscosity range, has good curability, and offers excellent bonding to various types of base materials. Furthermore, it has an effect of preventing migration from occurring in printed areas even when the ink composition is printed in a heated state.

It should be noted that all components including unpolymerized components and initiator fragments that are extracted by an aqueous ethanol solution in printed areas formed by printing and curing active energy ray-curable inkjet ink compositions, are referred to as "migration components."

MODE FOR CARRYING OUT THE INVENTION

The active energy ray-curable inkjet ink composition proposed by the present invention (hereinafter also referred to simply as "ink composition" depending on the situation) is explained below. It should be noted that, should any compound exist that corresponds to more than one of the components in the requirements of (A) to (C) below, that compound is counted as all of the applicable components.

Also, all polymerizable components in the present invention refer to the monomers and oligomers contained in the ink composition, representing all components that will react with each other and polymerize at the time of curing.

(A) Hydroxy Group-Containing Monofunctional (Meth) Acrylates

The active energy ray-curable inkjet ink composition proposed by the present invention contains hydroxy group-containing monofunctional (meth)acrylates. The hydroxy group-containing monofunctional (meth)acrylates include, for example, hydroxymethyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-methoxypropyl (meth)acrylate, 2-hydroxy-3-butoxypropyl (meth)acrylate, diethylene glycol mono(meth)acrylate, triethylene glycol mono(meth)acrylate, and other polyethylene glycol mono(meth)acrylates, dipropylene glycol mono(meth)acrylate, tripropylene glycol mono(meth)acrylate and other polypropylene glycol mono (meth)acrylates, 1,6-hexanediol mono(meth)acrylate, glycerin mono(meth)acrylate, 2-hydroxy-3-chloropropyl (meth) acrylate, 2-hydroxy-3-phenoxypropyl (meth)acrylate, 2-hydroxy-3-allyloxypropyl (meth)acrylate, (meth)acrylic acid-2-hydroxy-3-allyloxypropyl, 2-(meth)acryloyloxyethyl-2-hydroxypropyl phthalate, etc.

Under the present invention, the hydroxy group-containing monofunctional (meth)acrylates in (A) are contained by 20.0 to 60.0% by mass in the total amount of all polymerizable components. They are contained by preferably 25.0% by mass or more, or more preferably 30.0% by mass or more, or yet more preferably 35.0% by mass or more, or most preferably 38.0% by mass or more. Also, they are contained by preferably 58.0% by mass or less, or more preferably 55.0% by mass or less, or yet more preferably 53.0% by mass or less, or most preferably 50.0% by mass or less. If it is under 20.0% by mass, sufficient curability and adhesion cannot be demonstrated, while a content exceeding 60.0% by mass prevents a demonstration of sufficient curability.

(B) Polyfunctional Monomers Having Ether Bonds

The active energy ray-curable inkjet ink composition proposed by the present invention contains polyfunctional monomers having ether bonds.

The polyfunctional monomers having ether bonds include ether group-containing poly(meth)acrylate-based compounds, ether group-containing polyvinyl-based compounds, and vinyl ether group-containing (meth)acrylate-based compounds, as described below.

(Ether Group-Containing Poly(Meth)Acrylate-Based Compounds)

These include neopentyl glycol PO-modified diacrylate ((PO) NPGDA), dipropylene glycol diacrylate (DPGDA), EO (10 mol or 20 mol)-modified bisphenol A di(meth) acrylate, ethoxylated (30) bisphenol A di(meth)acrylate, di(meth)acrylate of ethylene oxide adduct of bisphenol A, di(meth)acrylate of ethylene oxide adduct of bisphenol F, di(meth)acrylate of ethylene oxide adduct of bisphenol S, di(meth)acrylate of ethylene oxide adduct of thiobisphenol, di(meth)acrylate of ethylene oxide adduct of brominated bisphenol A and other di(meth)acrylates of bisphenol alkylene oxide adducts, diethylene glycol di(meth)acrylate, triethylene glycol di(meth)acrylate, tetraethylene glycol di(meth)acrylate, polyethylene glycol (400) di(meth)acrylate, polyethylene glycol (600) diacrylate and other polyethylene glycol di(meth)acrylates, dipropylene glycol di(meth)acrylate, tripropylene glycol di(meth)acrylate and other polypropylene glycol di(meth)acrylates, alkoxylated hexanediol diacrylate, di(meth)acrylate of neopentyl glycol hydroxypivalate ester, etc.

As the ether group-containing poly(meth)acrylate-based compounds, neopentyl glycol PO-modified diacrylate ((PO) NPGDA), alkoxylated neopentyl glycol di(meth)acrylate, dipropylene glycol diacrylate (DPGDA), ethoxylated (3) trimethylolpropane tri(meth)acrylate, ethoxylated (6) trimethylolpropane tri(meth)acrylate, ethoxylated (9) trimethylolpropane tri(meth)acrylate, propoxylated (3) trimethylolpropane tri(meth)acrylate, ethylene oxide-modified product of trimethylolpropane tri(meth)acrylate, ethylene oxide-modified product of pentaerythritol tetra(meth)acrylate, ethylene oxide-modified product of dipentaerythritol penta(meth)acrylate, ethylene oxide-modified product of dipentaerythritol hexa(meth)acrylate, caprolactam-modified dipentaerythritol hexa(meth)acrylate, pentaerythritol ethoxytetraacrylate, alkoxylated tetrahydrofurfuryl acrylate, etc., are further preferred.

(Ether Group-Containing Polyvinyl-Based Compounds)

These include diethylene glycol divinyl ether, cyclohexane dimethanol divinyl ether, dipropylene glycol divinyl ether, butanediol divinyl ether, triethylene glycol divinyl ether, trimethylolpropane diallyl ether, propylene glycol divinyl ether, hexanediol divinyl ether, etc.

(Vinyl Ether Group-Containing (Meth)Acrylate-Based Compounds)

Vinyl ether group-containing (meth)acrylate-based compounds include, for example, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 3-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth) acrylate, 4-vinyloxycyclohexyl (meth)acrylate, 5-vinyloxypentyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate and other vinyloxyalkyl (meth)acrylates, p-vinyloxymethylphenylmethyl (meth)acrylate, m-vinyloxymethylphenylmethyl (meth) acrylate, o-vinyloxymethylphenylmethyl (meth)acrylate, vinyloxyethoxyethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, etc.

(Polyfunctional Monomers Having Ether Bonds)

And, under the present invention, preferably ether group-containing poly(meth)acrylate-based compounds are adopted as the polyfunctional monomers having ether bonds.

The content of polyfunctional monomers having ether bonds in the total amount of all polymerizable components is preferably 5.0% by mass or higher, or more preferably 10.0% by mass or higher, or yet more preferably 13.0% by mass or higher, or most preferably 15.0% by mass or higher.

Also, it is preferably 60.0% by mass or lower, or more preferably 55.0% by mass or lower, or yet more preferably 50.0% by mass or lower, or most preferably 45.0% by mass or lower.

(C) Amine-Modified Oligomers

The active energy ray-curable inkjet ink composition proposed by the present invention contains amine-modified oligomers as photopolymerizable compounds. The amine-modified oligomers are not specifically limited so long as they are amine-modified oligomers having at least one amino group and at least one (meth)acryloyl group in the molecule.

And, while the aforementioned amine-modified (meth)acrylate oligomers are not specifically limited in terms of the number of (meth)acryloyl groups in the molecule so long as they are polyfunctional amine-modified (meth)acrylate oligomers where this number is 2 or greater, the number is preferably 2 or greater but no greater than 6, or more preferably 2 or greater but no greater than 4. When the number of (meth)acryloyl groups is 2 or greater but no greater than 6, such polyfunctional amine-modified (meth)acrylate oligomers will easily react with the polymerizable compounds and also the viscosity of the active energy ray-curable inkjet ink composition will likely fall within an appropriate range.

The polyfunctional amine-modified (meth)acrylate oligomers may be synthesized products polymerized from desired monomers, or they may be commercial products. For example, the commercial products include GENOMER 5161, GENOMER 5275 (RAHN AG), CN 371, CN 371 NS, CN 373, CN 383, CN 384, CN 386, CN 501, CN 503, CN 550, CN 551 (Sartomer Inc.), EBECRYL 80, EBECRYL 81, EBECRYL 83, EBECRYL 7100, EBECRYL 84, EBECRYL P115 (Daicel-Allnex Ltd.), LAROMER PO 83F, LAROMER PO 84F, LAROMER LR 8946, LAROMER LR 8956, LAROMER LR 8996, LAROMER LR8894 (BASF SE), AgiSyn 001, AgiSyn 002, AgiSyn 003, AgiSyn 008 (DSM Coating Resins Ltd.), PHOTOMER 4771, PHOTOMER 4775, PHOTOMER 4967, PHOTOMER 5096, PHOTOMER 5662, PHOTOMER 5930 (Cognis), DOUBLECURE EPD, DOUBLECURE OPD, DOUBLECURE 115, DOUBLECURE 225, DOUBLECURE 645, POLY Q 222, POLY Q 226, POLY Q 224 and POLY Q 101 (Double Bond Chemical Ind. Co., Ltd.). Of these, oligomers having two photopolymerizable functional groups in the molecule are preferred, while those whose photopolymerizable functional groups are (meth)acryloyl groups are more preferred.

The polyfunctional amine-modified (meth)acrylate oligomers that can be used in the present invention are contained by 10.0 to 50.0% by mass in the total amount of all polymerizable components in the active energy ray-curable inkjet ink composition. Their content is preferably 12.0% by mass or higher, or more preferably 15.0% by mass or higher, or yet more preferably 18.0% by mass or higher, or most preferably 20.0% by mass or higher. Also, it is preferably 45.0% by mass or lower, or more preferably 42.0% by mass or lower, or yet more preferably 40.0% by mass or lower, or most preferably 38.0% by mass or lower. If it is under 10.0% by mass, sufficient curability cannot be demonstrated and also bringing the viscosity of the active energy ray-curable inkjet ink composition to an appropriate range becomes difficult, while a content exceeding 50.0% by mass prevents a demonstration of sufficient curability.

Photopolymerizable components other than (A) to (C) above, which are components that can be contained to the extent that the effects of the present invention are not impaired, are explained below. The greater the contained amount of these components whose molecular weight is particularly low, the more likely a migration will occur after printing.

(Other Monofunctional Photopolymerizable Components)

Other monofunctional photopolymerizable components include those listed below, for example.

(Monofunctional Alkyl (Meth)Acrylates)

Monofunctional alkyl (meth)acrylates include methyl (meth)acrylate, ethyl (meth)acrylate, propyl (meth)acrylate, butyl (meth)acrylate, isobutyl (meth)acrylate, t-butyl (meth)acrylate, isoamyl (meth)acrylate, octyl (meth)acrylate, isooctyl acrylate, 2-ethylhexyl (meth)acrylate, decyl (meth)acrylate, isodecyl (meth)acrylate, tridecyl (meth)acrylate, isomyristyl (meth)acrylate, stearyl (meth)acrylate, isostearyl (meth)acrylate, lauryl (meth)acrylate and other alkyl (meth)acrylates, cyclohexyl (meth)acrylate, butylcyclohexyl (meth)acrylate, 3,3,5-trimethylcyclohexyl acrylate, isobornyl (meth)acylate, adamantyl (meth)acrylate, dicyclopentanyl (meth)acrylate, dicyclopentenyl (meth)acrylate, t-butylcyclohexyl (meth)acrylate and other cyclic hydrocarbon group-containing (meth)acrylates.

And, under the present invention, these monofunctional alkyl (meth)acrylates may be contained by 12.0% by mass or less in the total amount of all polymerizable components. In particular, they are contained by preferably 5.0% by mass or less, or more preferably 1.0% by mass or less, or yet more preferably 0.5% by mass or less.

(Monofunctional (Meth)Acylates Having Ether Bonds)

These include ethyl carbitol (meth)acrylate, ethoxyethyl (meth)acrylate, 2-methoxyethyl (meth)acrylate, butoxyethyl (meth)acrylate and other alkoxyalkyl (meth)acrylates, 2-(2-ethoxyethoxy)ethyl (meth)acrylate, 2-ethylhexyl-diethylene glycol (meth)acrylate, ethoxydiethylene glycol (meth)acrylate, diethylene glycol monoethyl ether (meth)acrylate, caprolactone (meth)acrylate, methoxydiethylene glycol (meth)acrylate, butoxydiethylene glycol (meth)acrylate, butoxytriethylene glycol (meth)acrylate, methoxytriethylene glycol (meth)acrylate, methoxypolyethylene glycol (meth)acrylate, methoxypropylene glycol (meth)acrylate and other (meth)acrylic acid esters of polyalkylene glycol monoalkyl ethers, etc.

Also included are phenoxyhexaethylene glycol (meth)acrylate, phenoxydiethylene glycol (meth)acrylate and other (meth)acrylic acid esters of polyalkylene glycol monoallyl ethers, tetrahydrofurfuryl (meth)acrylate, (2-methyl-2-ethyl-1,3-dioxolane-4-yl)methyl (meth)acrylate, (3-ethyloxetane-3-yl)methyl methacrylate, caprolactone-modified tetrahydrofurfuryl (meth)acrylate, cyclic trimethylolpropane formal (meth)acrylate and other (meth)acrylates having heterocyclic structure, etc.

Also included are 2-hydroxy-3-phenoxypropyl (meth)acrylate, ethoxyphenyl (meth)acrylate (EO 2 mol), ethoxyphenyl (meth)acrylate (EO 1 mol), 2-(meth)acryloyloxyethyl-succinic acid, 2-(meth)acryloyloxyethyl-phthalic acid, 2-(meth)acryloyloxyethyl-hexahydrophthalic acid, 2-(meth)acryloyloxyethyl-2-hydroxyethyl-phthalic acid, lactone-modified flexible (meth)acrylate, EO (ethylene oxide)-modified succinate (meth)acrylate, methylphenoxyethyl (meth)acrylate, 2-phenoxyethyl (meth)acrylate and ethylene oxide-modified product thereof, 2-ethylhexyl carbitol (meth)acrylate, 2-ethylhexyl EO-modified (meth)acrylate, o-phenylphenol EO-modified acrylate, p-cumylphenol EO-modified (meth)acrylate, nonylphenol EO-modified (meth)acrylate and other (poly)alkylene glycol-modified (meth)acrylates, etc.

(Other Monofunctional Photopolymerizable Monomers)

These include acryloylmorpholine, N-vinylcaprolactam, acrylamide, acrylonitrile, (meth)acrylamide, N-methoxymethyl acrylamide, diacetone acrylamide, N,N-dimethyl(meth)acrylamide, N,N-diethyl(meth)acrylamide, hydroxymethyl(meth)acrylamide, di(2-hydroxyethyl)(meth)acrylamide, di(3-hydroxypropyl)(meth)acrylamide, di(4-hydroxybutyl)(meth)acrylamide and other N-alkylol (C1-5)(meth)acrylamides, ethylene oxide or propylene oxide 1-to-3-mol adducts of these N-alkylol (C1-5) (meth)acrylamides and other monofunctional monomers having amide structure, N-vinylcarbazole, N-vinylacetamide, N-vinylpyrrolidone, vinyl methyl oxazolidinone, (meth)acryloylpyrrolidine, (meth)acryloylpiperidine, lactone-modified flexible acrylate and other nitrogen-containing monomers, styrene, (meth)acrylic acid, vinyl acetate, urethane (meth)acrylate, epoxy (meth)acrylate, benzyl (meth)acrylate, 2-methacryloyloxyethylhexahydrophthalic acid and other compounds, etc.

(Other Polyfunctional Photopolymerizable Components)
(Polyfunctional Monomers Having No Ether Bonds)

These include ethylene glycol di(meth)acrylate, propylene glycol di(meth)acrylate, cyclohexanedimethanol di(meth)acrylate, dicyclopentanyl di(meth)acrylate, dimethyloloctane di(meth)acrylate, dimethylol-tricyclodecane di(meth)acrylate, dimethylolpropane di(meth)acrylate, 1,3-butylene glycol di(meth)acrylate, 1,4-dimethyl-2,4-pentanediol di(meth)acrylate, 1,4-butylene glycol di(meth)acrylate, 1,5-dimethyl-2,5-hexanediol di(meth)acrylate, 1,5-pentanediol di(meth)acrylate, pentyl glycol di(meth)acrylate, neopentyl glycol di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2,4-diethyl-1,5-pentanediol di(meth)acrylate, 2-methyl-1,3-butylene glycol di(meth)acrylate, 2-n-butyl-2-ethyl-1,3-propanediol di(meth)acrylate, dimethyloldicyclopentane di(meth)acrylate and other alkylene diol di(meth)acrylates, pentaerythritol di(meth)acrylate, pentaerythritol di(meth)acrylate monostearate, pentaerythritol di(meth)acrylate monobenzoate, glycerin di(meth)acrylate, 2-hydroxy-1,3-di(meth)acryloxypropane, trimethylolpropane tri(meth)acrylate, pentaerythritol tri(meth)acrylate, dipentaerythritol penta(meth)acrylate, dipentaerythritol hexa(meth)acrylate and other alkylene polyol poly(meth)acrylates, tricyclodecane dimethylol dicaprolactonate di(meth)acrylate and other polyfunctional (meth)acrylate monomers having no ether groups, etc. Of these, alkylene diol di(meth)acrylates are preferred.

(Oligomers Not Modified with Amine)

As oligomers not modified with amine, epoxy (meth)acrylate oligomers may be contained.

The epoxy (meth)acrylate oligomers may be synthesized products polymerized from desired monomers, or they may be commercial products. For example, the commercial products include EBECRYL 3708, EBECRYL 1606 (Daicel-Cytec Co., Ltd.), CN 116, CN 120 B60, CN 120 M50, CN 131 B, CN 132, CN 137, CN 152, CN 153, CN 2102 E and CN 2003 (Sartomer Inc.).

(D) Polymerization Initiators

The active energy ray-curable inkjet ink composition proposed by the present invention contains ethyl phenyl(2,4,6-trimethylbenzoyl)phosphinate (TPO-L) as a photopolymerization initiator. And, preferably it is contained by 1.0 to 10.0 parts by mass relative to 100 parts by mass representing the total amount of all polymerizable components in the active energy ray-curable inkjet ink composition.

In addition to the above, bis(2,4,6-trimethylbenzoyl)phenylphosphine oxide (OMNIRAD 819) can be contained. And, preferably it is contained by 1.0 to 10.0 parts by mass relative to 100 parts by mass representing the total amount of all polymerizable components in the active energy ray-curable inkjet ink composition.

Also, 2,4,6-trimethylbenzoyl-diphenyl-phosphine oxide (TPO) may or may not be contained.

(Other Photopolymerization Initiators)

The active energy ray-curable inkjet ink composition proposed by the present invention may contain photopolymerization initiators other than the above, to the extent that the effects of the present invention are not impaired. These photopolymerization initiators are not specifically limited so long as they initiate polymerization upon receiving active energy rays, and any photopolymerization initiators used in active energy ray-curable inkjet ink compositions can be used.

The photopolymerization initiators include, for example, benzoin ether-based photopolymerization initiators, acetophenone-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzyl-based photopolymerization initiators, benzophenone-based photopolymerization initiators, ketal-based photopolymerization initiators, thioxanthone-based photopolymerization initiators, triazine-based photopolymerization initiators, acylphosphine oxide-based photopolymerization initiators, etc. Of these, triazine-based photopolymerization initiators and acylphosphine oxide-based photopolymerization initiators are preferred from the viewpoint of their good curability under light-emitting diode (LED) rays. Any of the aforementioned photopolymerization initiators may be used alone, or two or more types may be combined.

Such photopolymerization initiators include, for example, ethoxy(2,4,6-trimethylbenzoyl)phenylphosphine oxide, benzophenone, diethyl thioxanthone, 2-methyl-1-(4-methylthio)phenyl-2-morpholinopropane-1-one, 4-benzoyl-4'-methyldiphenyl sulfide, 1-chloro-4-propoxythioxanthone, isopropyl thioxanthone, 2-hydroxy-2-methyl-1-phenylpropane-1-one, 1-hydroxycyclohexyl phenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2-benzyl-2-dimethylamino-1-(morpholinophenyl)-butane-1-one, etc.

(E) Polymeric Sensitizers

Polymeric sensitizers are used under the present invention. Thioxanthone-based polymeric sensitizers and acylphosphine-based polymeric sensitizers include OMNIPOL-TX ((2-carboxymethoxythioxanthone)-(polytetramethylene glycol 250) diester, number-averaged molecular weight: 660, manufactured by IGM Resins B.V.), SPEEDCURE 7010 (molecular weight: 1839, manufactured by Lambson Ltd.), GENOPOL TX-1 (number-averaged molecular weight: 820, manufactured by RaHN AG), etc., as well as oligo (2-hydroxy-2-methyl-1-(4-(1-methylvinyl) phenyl)propanone) (ESACURE KIP 150, ESACURE 1, manufactured by Lamberti S.p.A.), polyethylene glycol 200-di(ß-4 (4-(2-dimethylamino-2-benzyl) butanonylphenyl) piperazine (OMNIPOL 910, manufactured by IGM Resins B.V.), (carboxymethoxymethoxybenzophenone)-(polyethylene glycol 250) diester (OMNIPOL BP, manufactured by IGM Resins, B.V.), etc. Any of these may be used alone, or multiple types may be combined.

Under the present invention, the polymeric sensitizers being contained improve curability, while use of polymeric sensitizers that do not migrate easily allows for reduction of volatile components and migration components remaining after curing.

Preferably the polymeric sensitizers are contained by 0.5 to 10.0 parts by mass relative to 100 parts by mass representing the total amount of all polymerizable components in the active energy ray-curable inkjet ink composition. And, their content is more preferably 1.0 part by mass or higher, or yet more preferably 1.5 parts by mass or higher, or most preferably 2.0 parts by mass or higher, while it is more preferably 6.0 parts by mass or lower, or yet more preferably 4.0 parts by mass or lower, or most preferably 3.5 parts by mass or lower.

(Other Sensitizers)

The active energy ray-curable inkjet ink composition proposed by the present invention may contain other sensitizers from the viewpoint of improving curability, to the extent that the effects of the present invention are not impaired. Any of the aforementioned sensitizers may be used alone, or two or more types may be combined.

While not specifically limited, such other sensitizers include thioxanthone-based, 4,4'-bis(diethylamino)benzophenone- and other benzophenone-based, anthraquinone-based, coumarin-based, etc. Of these, 2,4-diethylthioxanthone, 2,4-dimethylthioxanthone, 2,4-diethylthioxanten-9-one, 2,4-dichlorothioxanthone, 1-chloro-4-propoxythioxanthone, 2-chlorothioxanthone, 2-isopropylthioxanthone, 4-isopropylthioxanthone, and other thioxanthone-based compounds, 9,10-dibutoxyanthracene, 9,10-diethoxyanthracene, 9,10-dipropoxyanthracene, 9,10-bis(2-ethylhexyloxy)anthracene, and other anthracene-based compounds, Michler's ketone, 4,4'-bis(diethylamino) benzophenone and other 4,4'-dialkylaminobenzophenones, etc., deserve special mention.

(Pigments)

The active energy ray-curable inkjet ink compositions proposed by the present invention may contain any pigments.

The pigments include various types of organic pigments and inorganic pigments used in inkjet ink compositions.

The aforementioned organic pigments include, for example, dye lake pigments, azo-based pigments, benzimidazolone-based pigments, phthalocyanine-based pigments, quinacridone-based pigments, dioxazine-based pigments, indigo-based pigments, thioindigo-based pigments, perylene-based pigments, perinone-based pigments, diketopyrrolopyrrole-based pigments, isoindolinone-based pigments, nitro-based pigments, nitroso-based pigments, anthraquinone-based pigments, flavanthrone-based pigments, quinophthalone-based pigments, pyranthrone-based pigments, indanthrone-based pigments, etc. Also, the aforementioned inorganic pigments include, for example, carbon black, titanium oxide, zinc oxide, red iron oxide, graphite, iron black, chrome oxide green, aluminum hydroxide, etc. The aforementioned pigments may be ones that have been surface-treated with known surface-treatment agents.

Specific examples of the aforementioned pigments are listed below by each representative hue.

Yellow pigments include, for examples, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc.

Magenta pigments include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, etc.

Cyan pigments include, for example, C. I. Pigment Blue 1, 2, 3, 15, 15:1, 15:2, 15:3, 15:4, 15:6, 16, 18, 22, 27, 29, 60, etc.

Orange pigments include, for example, C. I. Pigment Orange 1, 2, 3, 4, 5, 13, 15, 16, 17, 19, 24, 31, 34, 36, 38, 40, 43, 46, 48, 49, 51, 60, 61, 62, 64, 65, 66, 67, 68, 69, 71, 72, 73, 74, 81, etc.

Violet pigments include, for example, C. I. Pigment Violet 1, 2, 3, 3:1, 3:3, 5:1, 13, 17, 19, 23, 25, 27, 29, 31, 32, 36, 37, 38, 42, 50, etc.

Black pigments include, for example, carbon black (C. I. Pigment Black 7), etc.

White pigments include, for example, titanium oxide, aluminum oxide, etc., which may have been surface-treated with alumina, silica, and various other materials.

(Pigment Dispersants)

Preferably pigment dispersants are used in the active energy ray-curable inkjet ink composition proposed by the present invention.

The aforementioned pigment dispersants are used to improve dispersibility of pigments and storage stability of the active energy ray-curable inkjet ink composition, and any conventionally-used pigment dispersants may be used without specific limitations; of these, however, preferably polymeric pigment dispersants are used. Any of the aforementioned pigment dispersants may be used alone, or two or more types may be combined.

The aforementioned polymeric pigment dispersants include, for example, carbodiimide-based dispersants, polyester amine-based dispersants, fatty acid amine-based dispersants, modified polyacrylate-based dispersants, modified polyurethane-based dispersants, multiplechain polymeric nonionic-based dispersants, polymeric ionic dispersants, etc.

Such polymeric pigment dispersants include BYKJET-9150, BYKJET-9151, BYKJET-9170, DISPERBYK-168, DISPERBYK-190, DISPERBYK-198, DISPERBYK-2010, DISPERBYK-2012, DISPERBYK-2015 (BYK-Chemie GmbH), SMA 1440, SMA 2625, SMA 17352, SMA 3840, SMA 1000, SMA 2000, SMA 3000 (Cray Valley), JONCRYL 67, JONCRYL 678, JONCRYL 586, JONCRYL 611, JONCRYL 680, JONCRYL 682, JONCRYL 690, JONCRYL 819, JONCRYL-JDX 5050, EFKA 4550, EFKA 4560, EFKA 4585, EFKA 4701, EFKA 5220, EFKA 6230 (BASF SE), SOLSPERSE 20000, SOLSPERSE 27000, SOLSPERSE 36000, SOLSPERSE 41000, SOLSPERSE 41090, SOLSPERSE 43000, SOLSPERSE 44000, SOLSPERSE 46000, SOLSPERSE 47000, SOLSPERSE 54000, SOLSPERSE 56000 (Lubrizol Corporation), AJISPER PB821, AJISPER PB822, AJISPER PB824, AJISPER PB881 (Ajinomoto Fine-Techno Co., Inc.), etc.

The content of pigment dispersants is preferably 1.0% by mass or higher, or more preferably 5.0% by mass or higher, while it is preferably 100% by mass or lower, or more preferably 60.0% by mass or lower, relative to the total pigment mass, from the viewpoint of increasing dispersibility of pigments and storage stability of the active energy ray-curable inkjet ink composition.
(Surfactants)

In the active energy ray-curable inkjet ink composition proposed by the present invention, any known surfactants used in active energy ray-curable inkjet ink compositions may be used without specific limitations according to the inkjet head used, including, for example, nonionic surfactants, cationic surfactants, anionic surfactants, and betaine surfactants. Specific examples of the aforementioned surfactants include, for example, polyether-modified silicone oil, polyester-modified polydimethylsiloxane, polyester-modified methylalkylpolysiloxane, and other silicone-based surfactants, fluorine-based surfactants, acetylene-based surfactants, etc. Any of the aforementioned surfactants may be used alone, or two or more types may be combined.

The aforementioned silicone-based surfactants include BYK-307, BYK-315N, BYK-331, BYK-333, BYK-347, BYK-348, BYK-349, BYK-345, BYK-377, BYK-378, BYK-3455 (BYK Chemie GmbH), etc.

The aforementioned fluorine-based surfactants include F-410, F-444, F-553 (DIC Corporation), FS-65, FS-34, FS-35, FS-31, FS-30 (DuPont de Nemours, Inc.), etc.

The aforementioned acetylene-based surfactants include DYNOL 607, DYNOL 609, OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, OLFINE EXP. 4300 (Nisshin Chemical Co., Ltd.), SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, SURFYNOL 465 (Evonik Industries AG), etc.

The percentage of the aforementioned surfactants in the active energy ray-curable inkjet ink composition proposed by the present invention is preferably 0.005% by mass or higher, or more preferably 0.01% by mass or higher, from the viewpoint of lowering surface tension of the ink composition and thereby increasing discharge stability from the inkjet head, while the percentage is preferably 1.5% by mass or lower, or more preferably 1% by mass or lower, from the viewpoint of reducing bubbles that form in the ink composition during blending and thereby increasing discharge stability.
(Solvents)

Although the active energy ray-curable inkjet ink composition proposed by the present invention is solvent-free, solvents may be blended in as necessary. The aforementioned solvents include ester-based organic solvents, ether-based organic solvents, ether ester-based organic solvents, ketone-based organic solvents, aromatic hydrocarbon solvents, nitrogen-containing organic solvents, etc. Also included in the aforementioned solvents are those whose boiling point is 150 to 220° C. at 1 atm. Preferably use of the aforementioned solvents is minimized to the maximum extent possible from the viewpoints of curability of the ink composition, environmental problems, and so on. The percentage of the aforementioned solvents is preferably 5% by mass or lower, or more preferably 2% by mass or lower, in the ink composition.
<Additives>

Various types of additives may be added to the active energy ray-curable inkjet ink composition proposed by the present invention, in order to manifest various functionalities as necessary. To be specific, these include surfactants, surface conditioners, photostabilizers, UV absorbents, surface treatment agents, storability-improving agents, antioxidants, antiaging agents, crosslinking promoters, polymerization inhibitors, plasticizers, anti-mold agents, preservatives, pH-adjusting agents, defoaming agents, humectants, rust-proofing agents, thickening agents, etc. Also, resins that function as a vehicle but are not curable may or may not be blended in. Additionally, solvents may or may not be contained.
(Surface Conditioners)

If surface conditioners are contained, the content of the surface conditioners is not specifically limited; however, preferably the content is such that surface tension of the active energy ray-curable inkjet ink composition falls between 22.0 and 30.0 mN/m, or more preferably the surface conditioners account for 0.10 to 1.50% by mass in the active energy ray-curable inkjet ink composition.
(Storability Improving Agents)

As the storability-improving agents, hindered amines of N—CH3 type, N—H type, N—OR type, etc., may be used.
(UV Absorbents)

The UV absorbents include benzophenone-based UV absorbents, benzotriazole-based UV absorbents, salicylate-based UV absorbents, hydroxyphenyltriazine-based UV absorbents, cyanoacrylate-based UV absorbents, nickel complex salt-based UV absorbents, etc.
(Antioxidants)

The antioxidants include phenol-based antioxidants, amine-based antioxidants, sulfur-based antioxidants, phosphorus-based antioxidants, etc.
(Defoaming Agents)

The defoaming agents include silicone-based defoaming agents, Pluronic (registered trademark)-based defoaming agents, etc.

Viscosity at 45° C. of the active energy ray-curable inkjet ink composition proposed by the present invention is preferably 30.0 cps or higher, or more preferably 35.0 cps or higher, or yet more preferably 40.0 cps or higher, or most preferably 50.0 cps or higher. Also, it is preferably 1000.0 cps or lower, or more preferably 100.0 cps or lower, or yet more preferably 80.0 cps or lower, or most preferably 60.0 cps or lower.

Additionally, viscosity at 80° C. is preferably 6.0 cps or higher, or more preferably 6.5 cps or higher, or yet more preferably 7.0 cps or higher, or most preferably 7.5 cps or higher. Also, it is preferably 15.0 cps or lower, or more preferably 12.0 cps or lower, or yet more preferably 11.0 cps or lower, or most preferably 10.0 cps or lower.

Also, viscosity-adjusting agents, etc., are blended in the ink composition as necessary. It should be noted that the viscosities mentioned in the Specification of the present application for patent represent viscosities measured using a type-E viscometer (RE100L Viscometer, manufactured by Toki Sangyo Co., Ltd.) under the conditions of 45° C. and 80° C., and 20 rpm.
<Method for Preparing Active Energy Ray-Curable Inkjet Ink Composition>

Next, how the active energy ray-curable inkjet ink composition proposed by the present invention is manufactured using these materials is explained.

The active energy ray-curable inkjet ink composition proposed by the present invention may be obtained by, for example, dispersing and mixing the respective components using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE 2000, etc.), pearl mill, or other dispersion machine, and then adjusting the viscosity of the active energy ray-curable inkjet ink composition as necessary. It should be noted that the active energy ray-curable inkjet ink composition may also be prepared by mixing pigments with the aforementioned pigment dispersants and photopolymerizable monomers to obtain a base ink composition first, and then adding the remainder of the aforementioned components thereto, to a desired compositional makeup.

<Method for Printing>

The method for printing using the active energy ray-curable inkjet ink composition proposed by the present invention is explained.

The inkjet printing device used is not specifically limited so long as it has a mechanism for heating the ink composition to a specific temperature. A method may be employed, for example, wherein the active energy ray-curable inkjet ink composition is supplied to the printer head of an inkjet recording printer device and the ink composition is discharged from this printer head onto the target base material to be printed, after which the ink composition that has landed on the base material is exposed to active energy rays and cured. The active energy rays include ultraviolet rays, electron beams, visible light, etc., irradiated from light-emitting diodes (LEDs), various types of lamps, and electrodes. In particular, the ink composition has excellent curability under ultraviolet rays from light-emitting diode (LED) light sources.

At the time of printing, 50° to 90° ° C. are preferred temperatures to heat the ink composition to, using the aforementioned heating mechanism.

Because an inkjet printing device is used to discharge the ink composition from the head at high temperature, materials that do not migrate easily (=materials of high molecular weight or those prone to interactions due to polar groups) can be selected.

Also, the base material is not specifically limited, either, and any base materials to which conventionally-known active energy ray-curable inkjet ink compositions can be applied may be used without specific limitations, where the aforementioned base materials include, for example, plastics, paper, capsules, gels, metal foils, glass, wood, fabric, etc. Additionally, the aforementioned plastics include, for example, polycarbonates, hard vinyl chlorides, soft vinyl chlorides, ABS, polyethylene terephthalates, and other polyesters, polypropylenes, acrylic resins, polystyrenes, etc.

The method for printing and curing the ink composition proposed by the present invention specifically may be one wherein the ink composition proposed by the present invention is discharged onto the base material from the inkjet head, after which the coating film formed by the ink composition proposed by the present invention that has landed on the base material is exposed to light and cured.

For example, discharge onto the base material (printing of images) can be accomplished by supplying the ink composition proposed by the present invention to the printer head through the heating device of the inkjet recording printer, and discharging the ink composition from the printer head in such a way that the film thickness of the coating film becomes 1 to 60 μm, for example, on the base material. Also, exposure to light and curing (curing of images) can be accomplished by irradiating light onto the coating film formed by the ink composition proposed by the present invention that has been applied onto the base material as images.

For the inkjet recording printer device with which to print the ink composition proposed by the present invention, any conventionally-used inkjet recording printer device may be utilized. It should be noted that, if a continuous-type inkjet recording printer device is used, conductivity-adding agents are further added to the ink composition proposed by the present invention to adjust its electrical conductivity.

The light sources used in the aforementioned curing of the coating film include ultraviolet rays (UV lamp), ultraviolet rays (light-emitting diodes (LEDs)), electron beams, visible light, etc., where light-emitting diodes (LEDs) generating ultraviolet rays whose emission peak wavelength is in a range of 350 to 420 nm are preferred from an environmental aspect.

Examples

The present invention is explained in greater detail below by citing examples; however, the present invention is not limited to these examples alone.

The active energy ray-curable inkjet ink compositions in the Examples and Comparative Examples shown in Table 1 below were prepared, and the test results and properties pertaining to the respective active energy ray-curable inkjet ink compositions are shown in Table 1.

P. Y. 150: Pigment Yellow 150
P. R. 122: Pigment Red 122
P. R. 254: Pigment Red 254
P. B. 15:4: Pigment Blue 15:4
P. Bk. 7: Carbon black
S56000: Water-soluble polymeric dispersant (SOLSPERSE S56000, Lubrizol Japan Ltd.)
BYKJET-9151: Water-soluble polymeric dispersant (BYKJET-9151, BYK-Chemie GmbH)
S36000: Water-soluble polymeric dispersant (SOLSPERSE S36000, Lubrizol Japan Ltd.)
CN 371 NS: Amine-modified (meth)acrylate oligomer (Sartomer CN 371 NS, Sartomer Arkema Inc.)
CN 373: Amine-modified (meth)acrylate oligomer (Sartomer Arkema Inc.)
AgiSyn 008: Amine-modified (meth)acrylate oligomer (DSM-AGI Corporation)
AgiSyn 003: Amine-modified (meth)acrylate oligomer (DSM-AGI Corporation)
(PO)NPGDA: Neopentyl glycol PO-modified diacrylate
DPGDA: Dipropylene glycol diacrylate
TPO: Photopolymerization initiator 2,4,6-trimethylbenzoyl-diphenyl-phosphine oxide
TPO-L: Photopolymerization initiator ethyl phenyl(2,4,6-trimethylbenzoyl)phosphinate
OMNIRAD 819: Photopolymerization initiator bis(2,4,6-trimethylbenzoyl)phenoxyphosphine oxide (IGM Resins B.V.)
OMNIPOL TX: Polymeric sensitizer (2-carboxymethoxythioxanthone)-(polytetramethylene glycol 250) diester (IGM Resins B.V.)
UV 22: Quinone-based polymerization inhibitor (BASF SE)
BYK-377: Silicone-based surface conditioner (BYK-Chemie GmbH)

(Viscosity)

The active energy ray-curable inkjet ink compositions obtained in the Examples and Comparative Examples were measured for viscosity (cps) using a type-E viscometer (product name: RE100L Viscometer, manufactured by Toki Sangyo Co., Ltd.) under the conditions of 45° C. and 80° C. in temperature and 20 rpm in rotor speed.

(Adhesion)

The active energy ray-curable inkjet ink compositions obtained in the Examples and Comparative Examples were applied on PET (polyethylene terephthalate) films (LUMIRROR (Toray Industries, Inc.)) and PP (polypropylene) films (YUPO 80 (UV) PA-TI (Yupo Corporation)) using a #4 bar coater under the condition of 25° C., and irradiated twice using a UV-LED lamp manufactured by Phoseon Technology under the irradiation conditions of 1-second irradiation time per irradiation (cumulative UV ray quantity per second 60 mJ/cm$^2$) with the distance between the lamp and the ink application surface set to 2 cm, to form cured coating films.

Each of the obtained cured coating films was cross-cut with a cutting knife into 100 small, square pieces of cured coating film. A piece of cellophane tape (product name: CELLOTAPE (registered trademark), manufactured by Nichiban Co., Ltd.) was adhered onto this cut area and then peeled off, to count the number of small, square pieces that remained on the base material, instead of adhering to the cellophane tape and being separated from the base material. For example, "100/100" indicates that all small pieces remained on the base material without any of them separating, while "20/100" indicates that 20 small pieces remained on the base material while 80 small pieces adhered to the cellophane tape and were separated.

(LED Curability)

An inkjet recording device and each active energy ray-curable inkjet ink composition were let stand for 24 hours at an ambient temperature of 25° C., to bring the temperatures of the inkjet recording device and ink composition to 25° C. Thereafter, at 25° C., the active energy ray-curable inkjet ink composition was applied on PVC80 (manufactured by LINTEC Corporation).

Next, the LED curability of the ink composition was evaluated, using a UV-LED lamp manufactured by Phoseon Technology under the irradiation conditions of 1-second irradiation time per irradiation (cumulative UV ray quantity per second 60 mJ/cm$^2$) with the distance between the lamp and the ink application surface set to 2 cm, based on the number of irradiations needed until no tackiness was left on the surface.

The resulting numbers of irradiations are shown in Table 1 ("○" denotes 1, and "x" denotes more than 1).

(Migration Test)

Printing conditions: each ink composition was printed on a PP film (product name: P-2161, Toyobo Co., Ltd.) using a single-pass printer at a printing speed of 48 m/min, and then LED-irradiated (irradiation energy 500 mJ) and cured. The obtained printed matter was cut to 13 mm×13 mm.

This film was put in approx. 200 mL of a 50% aqueous ethanol solution and let stand for 10 days at 40° C.

After leaving to stand, the aqueous ethanol solution was collected and an internal standard solution was added.

The collected aqueous ethanol solution was passed through a solid-phase extraction cartridge, and the retained components were eluted with 1 ml of methanol (concentrated 200 times).

The obtained solution was analyzed by gas chromatography mass spectrometry (GC/MS), to measure the migrated amount of the coating film. The trend of occurrence of migration can be checked by measuring this amount.

TABLE 1

| | Examples | | | | | | | Comparative Examples |
|---|---|---|---|---|---|---|---|---|
| | 1 | 2 | 3 | 4 | 5 | 6 | 7 | 1 |
| PY150 | | | | | | 2.28% | | |
| P.R.122 | | | | | 1.60% | | | |
| PR254 | | | | | 1.92% | | | |
| P. B. 15:4 | 2.60% | 2.60% | 2.60% | 2.60% | | | | 2.60% |
| P. Bk. 7 | | | | | | | 1.60% | |
| S56000 | 1.04% | 1.04% | 1.04% | 1.04% | | | 0.64% | 1.04% |
| BYKJET9151 | | | | | 0.77% | | | |
| S36000 | | | | | | 0.64% | 0.91% | |
| CN371NS | 30.00% | 15.00% | | | 21.00% | 25.50% | 28.70% | 30.00% |
| CN373 | | 15.00% | | | | | | |
| AgiSyn008 | | | 30.00% | | | | | |
| AgiSyn003 | | | | 30.00% | | | | |
| Benzyl acrylate | | | | | | | | |
| Isobornyl acrylate | | | | | | | | |
| 1,6-hexanediol diacrylate | 4.50% | 4.50% | 4.68% | 4.68% | 8.54% | 4.10% | 2.88% | 19.46% |
| (PO)NPGDA | 7.96% | 7.96% | 7.78% | 7.78% | 16.14% | 13.80% | 9.93% | |
| DPGDA | 7.00% | 7.00% | 7.00% | 7.00% | 2.00% | 6.50% | 9.90% | |
| 4-hydroxybutyl acrylate | 35.80% | 35.80% | 35.80% | 35.80% | 35.80% | 35.80% | 35.80% | 35.80% |
| Lauryl acrylate | | | | | | | | |
| TPO | | | | | | | | |
| TPO-L | 5.00% | 5.00% | 5.00% | 5.00% | 6.00% | 4.50% | 4.50% | 5.00% |
| OMNIRAD819 | 3.00% | 3.00% | 3.00% | 3.00% | 3.00% | 3.50% | 3.50% | 3.00% |
| OMNIPOL TX | 2.50% | 2.50% | 2.50% | 2.50% | 2.00% | 2.50% | 1.90% | 2.50% |
| UV22 | 0.40% | 0.40% | 0.40% | 0.40% | 0.40% | 0.40% | 0.40% | 0.40% |
| BYK-377 | 0.20% | 0.20% | 0.20% | 0.20% | 0.20% | 0.20% | 0.20% | 0.20% |
| Total | | | | | 100.0% | | | |
| | 1.07 | | | | | 1.07 | 1.07 | 1.07 |
| Viscosity (cps) @ 45° C. | 58.5 | 45.8 | 58.2 | 38.8 | 57.5 | 57.2 | 62.6 | 41.1 |
| Viscosity (cps) @ 80° C. | 9.3 | 8.5 | 9.2 | 7.8 | 9.4 | 9.3 | 9.5 | 8.1 |

TABLE 1-continued

| | | | | | | | | |
|---|---|---|---|---|---|---|---|---|
| Adhesion PET | | | | 100/100 | | | | 100/100 |
| Adhesion PP | | | | 100/100 | | | | 100/100 |
| LED curability | ○ | ○ | ○ | ○ | ○ | ○ | ○ | ○ |
| Migrated amount of coating film (ppb) | 8 | 6 | 10 | 8 | 7 | 8 | 8 | 120 |

| | Comparative Examples | | | | | |
|---|---|---|---|---|---|---|
| | 2 | 3 | 4 | 5 | 6 | 7 |
| PY150 | | | | | | |
| P.R.122 | | | | | | |
| PR254 | | | | | | |
| P. B. 15:4 | 2.60% | 2.60% | 2.60% | 2.60% | 2.60% | 2.60% |
| P. Bk. 7 | | | | | | |
| S56000 | 1.04% | 1.04% | 1.04% | 1.04% | 1.04% | 1.04% |
| BYKJET9151 | | | | | | |
| S36000 | | | | | | |
| CN371NS | 30.00% | 30.00% | 30.00% | 30.00% | 30.00% | 5.00% |
| CN373 | | | | | | |
| AgiSyn008 | | | | | | |
| AgiSyn003 | | | | | | |
| Benzyl acrylate | | | 30.00% | | | |
| Isobornyl acrylate | | 30.00% | | | | |
| 1,6-hexanediol diacrylate | 4.50% | 4.50% | 4.50% | 4.50% | 4.50% | 4.50% |
| (PO)NPGDA | | | | 7.96% | 7.96% | 7.96% |
| DPGDA | | | | 7.00% | 7.00% | 7.00% |
| 4-hydroxybutyl acrylate | 35.80% | 35.80% | 35.80% | 35.80% | 38.30% | 60.80% |
| Lauryl acrylate | 14.96% | 4.96% | 4.96% | | | |
| TPO | | | | 5.00% | | |
| TPO-L | 5.00% | 5.00% | 5.00% | | 5.00% | 5.00% |
| OMNIRAD819 | 3.00% | 3.00% | 3.00% | 3.00% | 3.00% | 3.00% |
| OMNIPOL TX | 2.50% | 2.50% | 2.50% | 2.50% | | 2.50% |
| UV22 | 0.40% | 0.40% | 0.40% | 0.40% | 0.40% | 0.40% |
| BYK-377 | 0.20% | 0.20% | 0.20% | 0.20% | 0.20% | 0.20% |
| Total | | | 100.0% | | | |
| Viscosity (cps) @ 45° C. | 36.8 | 22.8 | 18.0 | 60.8 | 52.2 | 21.2 |
| Viscosity (cps) @ 80° C. | 7.6 | 4.3 | 3.6 | 9.4 | 9.0 | 5.4 |
| Adhesion PET | 100/100 | | 70/100 | | 100/100 | |
| Adhesion PP | 100/100 | | 10/100 | | 100/100 | |
| LED curability | ○ | ○ | ○ | ○ | X | X |
| Migrated amount of coating film (ppb) | 180 | 420 | 530 | 250 | 9 | 390 |

According to the Examples that represent examples conforming to the present invention, the active energy ray-curable inkjet ink compositions had viscosities at 80° ° C. in a range appropriate for active energy ray-curable inkjet ink compositions, and they were excellent in adhesion to various types of base materials and in LED curability. Furthermore, the migrated amounts of their coating films were extremely small.

By contrast, Comparative Examples 1 and 2 not containing (B) polyfunctional monomers having ether bonds, and Comparative Example 5 not containing ethyl phenyl(2,4,6-trimethylbenzoyl)phosphinate, resulted in the coating films migrating by extremely large amounts.

Meanwhile, Comparative Examples 3 and 4 containing isobornyl acrylate or benzyl acrylate also resulted in large amounts of migration.

Comparative Example 6 not containing polymeric sensitizers, and Comparative Example 7 containing less amine-modified oligomers, showed poor LED curability.

What is claimed:

1. An active energy ray-curable inkjet ink composition satisfying all of requirements of (A) to (E) below:
   (A) it contains hydroxy group-containing monofunctional (meth)acrylates by 20.0 to 60.0% by mass in a total amount of all polymerizable components;
   (B) it contains polyfunctional monomers having ether bonds;
   (C) it contains amine-modified oligomers by 10.0 to 50.0% by mass in a total amount of all polymerizable components;
   (D) it contains ethyl phenyl(2,4,6-trimethylbenzoyl)phosphinate as a polymerization initiator; and
   (E) it contains polymeric sensitizers.

2. The active energy ray-curable inkjet ink composition according to claim 1, wherein the polymeric sensitizer in (E) is a thioxanthone-based compound.

3. The active energy ray-curable inkjet ink composition according to claim 1, further containing bis(2,4,6-trimethylbenzoyl)phenylphosphine oxide by 1.0 to 10.0 parts by mass relative to 100 parts by mass representing a total amount of all polymerizable components in the active energy ray-curable inkjet ink composition.

4. The active energy ray-curable inkjet ink composition according to claim 1, containing the ethyl phenyl(2,4,6-trimethylbenzoyl)phosphinate in (D) by 1.0 to 10.0 parts by mass relative to 100 parts by mass representing a total amount of all polymerizable components in the active energy ray-curable inkjet ink composition.

5. The active energy ray-curable inkjet ink composition according to claim 1, wherein the polymeric sensitizer in (E) is (2-carboxymethoxythioxanthone)-(polytetramethylene glycol 250) diester.

6. The active energy ray-curable inkjet ink composition according to claim 1, further satisfying requirement (F) below:
   (F) it has a viscosity at 45° C. of 38.0 cps or higher and a viscosity at 80° C. of 15 cps or lower.

7. The active energy ray-curable inkjet ink composition according to claim 1, further containing polyfunctional monomers having no ether bonds and/or monofunctional alkyl (meth)acrylates.

* * * * *